United States Patent
Horng et al.

(10) Patent No.: US 6,614,630 B2
(45) Date of Patent: Sep. 2, 2003

(54) TOP SPIN VALVE HEADS FOR ULTRA-HIGH RECORDING DENSITY

(75) Inventors: Cheng Horng, San Jose, CA (US); Ru-Ying Tong, San Jose, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 214 days.

(21) Appl. No.: 09/839,960

(22) Filed: Apr. 23, 2001

(65) Prior Publication Data

US 2002/0154457 A1 Oct. 24, 2002

(51) Int. Cl.[7] .................................................. G11B 5/39
(52) U.S. Cl. .................................................. 360/324.12
(58) Field of Search ........................ 360/324.12, 324.1; 29/603.14, 603.15

(56) References Cited

U.S. PATENT DOCUMENTS

| | | | | |
|---|---|---|---|---|
| 5,608,593 A | * | 3/1997 | Kim et al. ............. | 360/324.12 |
| 5,627,704 A | * | 5/1997 | Lederman et al. .......... | 360/321 |
| 5,717,550 A | | 2/1998 | Nepela et al. ............. | 360/113 |
| 5,764,567 A | | 6/1998 | Parkin ........................ | 365/173 |
| 5,828,527 A | * | 10/1998 | Takada et al. ............ | 360/327.3 |
| 5,841,692 A | | 11/1998 | Gallagher et al. .......... | 365/173 |
| 5,919,580 A | | 7/1999 | Barnard et al. ............. | 428/692 |
| 5,936,293 A | | 8/1999 | Parkin ........................ | 257/422 |
| 5,949,622 A | * | 9/1999 | Kamiguchi et al. .... | 360/324.12 |
| 6,153,319 A | * | 11/2000 | Hasegawa ................... | 428/692 |
| 6,275,362 B1 | * | 8/2001 | Pinarbasi ............... | 360/324.12 |
| 6,466,418 B1 | * | 10/2002 | Horng et al. ........... | 360/324.12 |

* cited by examiner

Primary Examiner—Brian E. Miller
(74) Attorney, Agent, or Firm—George O. Saile; Stephen B. Ackerman

(57) ABSTRACT

A method for fabricating a specularly reflecting top spin valve read head with an ultra-thin free layer that is capable of reading ultra-high density recordings. This top spin valve has a composite CoFe—NiFe free layer that is formed on a composite Ru—Cu buffer layer which provides lattice-matching to the free layer as well as enhanced specular reflection. The free layer is pinned by a synthetic antiferromagnetic pinning layer. The resulting fabrication has a conducting lead layer formed over it that defines the sensor trackwidth and a magnetic bias layer formed outside of the conducting lead layer.

34 Claims, 4 Drawing Sheets

|  | Bs | Hc | He | Hk | Rs | Dr/r | Dr | $\lambda_s$ |
|---|---|---|---|---|---|---|---|---|
| CZB55/NiFe32/CoFe35/Cu20/CoFe21/Ru7.5/CoFe19/MP120/CZB20 | 0.29 | 14.0 | -7.56 | 8.6 | 16.8 | 11.0 | 2.02 | 3.20E-06 |
| CZB55/Cu10/NiFe34/CoFe2/Cu19/CoFe21/Ru7.5/CoFe19/MP120/CZB20 | 0.29 | 7.75 | 5.96 | 4.9 | 17.1 | 10.21 | 1.74 | 3.00E-06 |
| CZB55/Ru5/CoFe20/Cu20/CoFe23/Ru7.5/CoFe18/MP120/CZB20 | 0.24 | 5.68 | 10.6 | 9.6 | 18.1 | 13.83 | 2.50 | 3.80E-06 |

FIG. 1

| STD. HCL AND BCL FREE LAYER | Bs | Hc | Hk | Rs | Dr/r | Oe to close HA | $\lambda_s$ |
|---|---|---|---|---|---|---|---|
| CZB55/Cu10//NiFe34/CoFe2/Cu20/CZB50 | 0.28 | 4.79 | 11.7 | 25.6 | 0.57 | 6 Oe | 3.50E-06 |
| CZB55/BCL5/CoFe20/Cu20/CZB50 | 0.25 | 5.35 | 9.5 | 34.9 | 0.28 | 9 Oe | 2.90E-06 |
| CZB55/Cu15/CoFe20/Cu20/CZB50 | 0.27 | 11.91 | 15.6 | 28.9 | 0.39 | 20 Oe | -3.68E-06 |

| | Bs | Hc | He | Hk | Rs | Dr/r | Dr | λs |
|---|---|---|---|---|---|---|---|---|
| CZB55/BCL5/CoFe15/Cu18/CoFe25/Ru7.5/CoFe15/MP120/CZB20 | 0.18 | 9.81 | 3.88 | 15.7 | 21.1 | 10.6 | 2.35 | 4.80E-06 |
| CZB55/BCL5/CoFe10/NiFe10/CoFe10/Cu19/Ru7.5/CoFe2/MP120/CZB20 | 0.18 | 14.8 | -19.5 | 18.8 | 21.2 | 11.2 | 2.38 | 2.20E-06 |
| CZB55/BCL5/Cu5/NiFe10/CoFe10/Cu19/Ru7.5/CoFe2/MP120/CZB20 | 0.21 | 11.4 | -17.4 | 15.4 | 20.8 | 12.2 | 2.54 | 1.80E-06 |
| CZB55/BCL5/Cu5/NiFe12/CoFe10/Cu19/Ru7.5/CoFe2/MP120/CZB20 | 0.22 | 11.0 | -17.9 | 15.5 | 19.8 | 12.2 | 2.41 | 2.00E-06 |

TOP SPIN VALVE HEADS FOR ULTRA-HIGH RECORDING DENSITY

RELATED PATENT APPLICATION

This application is related to Docket No. HT99-031, Ser. No. 09/992,517, filing date Nov. 14, 2001, to Docket No. HT99-035, Ser. No. 09/570,017, filing date May 12, 2000, now issued as U.S. Pat. No. 6,522,507 and to Docket No. HT00-026, Ser. No. 09/747234, filing date Dec. 26, 2000, assigned to the same assignee as the current invention.

BACKGROUND OF THE INVENTION

1. Field of the Invention

This invention relates generally to the fabrication of a giant magnetoresistive (GMR) magnetic field sensor in a magnetic read head, more specifically to a spin valve type of GMR sensor of the top spin valve type having an ultra-thin free layer.

2. Description of the Related Art

Early forms of magnetic read heads decoded magnetically stored data on media such as disks and tapes by making use of the anisotropic magnetoresistive effect (AMR) in magnetic materials such as permalloy. This effect is the change in the electrical resistance, r, of certain magnetic materials in proportion to the angle between the direction of their magnetization and the direction of the current through them. Since changing magnetic fields of moving magnetized media, such as magnetically encoded tapes and disks, will change the direction of the magnetization in a read head, the resistance variations of the AMR effect allows the information on such encoded media to be sensed and interpreted by appropriate circuitry.

One shortcoming of the AMR effect was the fact that it produced a maximum fractional resistance change, Dr/r also called MR, the magnetoresistive ratio, (where Dr is the change in resistance between the magnetic material subjected to its anisotropy field, $H_k$, and the material subjected to zero field), which was only on the order of a few percent. This made the sensing process difficult to achieve with accuracy.

In the late 1980's and early 1990's the phenomenon of giant magnetoresistance (GMR) was discovered and soon applied to read head technology. The GMR effect derives from the fact that thin layers of ferromagnetic materials, between 20 and 80 Å (Angstroms) when separated by even thinner (20–30 Å) layers of electrically conductive but non-magnetic materials, will acquire ferromagnetic (parallel spin direction of the layers) or antiferromagnetic states (antiparallel spin direction of the layers) by means of exchange interactions between the layers. As a result of spin dependent electron scattering as electrons crossed the layers, the magnetoresistance of such layered structures was found to be significantly higher in the antiferromagnetic state than the ferromagnetic state and the fractional change in resistance was much higher than that found in the AMR of individual magnetic layers.

Shortly thereafter a version of the GMR effect called spin valve magnetoresistance (SVMR) was discovered and implemented. In the SVMR version of GMR, two ferromagnetic layers such as CoFe or NiFe are separated by a thin layer of electrically conducting but non-magnetic material such as Cu. One of the layers has its magnetization direction fixed in space or "pinned," by exchange coupling with an antiferromagnetic layer directly deposited upon it. The remaining ferromagnetic layer, the unpinned or free layer, can rotate its magnetization vector in response to small variations in external magnetic fields such as are produced by moving magnetic media, (which do not affect the magnetization direction of the pinned layer). This rotation of one magnetization relative to the other then produces changes in the magnetoresistance of the three layer structure. Other forms of the spin valve utilize an antiferromagnetic layer for the pinned layer. Nepela et al. (U.S. Pat. No. 5,717,550) disclose a spin valve magnetoresistive sensor in which a buffer layer is deposited on a soft adjacent layer (ie. a layer with reduced magnetic coercivity), wherein the soft adjacent layer provides longitudinal biasing for the magnetoresistive sensor element whereas the buffer layer provides an enhanced exchange coupling to an antiferromagnetic layer deposited over the fabrication for the purpose of fixing the magnetization direction of the pinned layer. Barnard et al. (U.S. Pat. No. 5,919,580) provides a spin valve device containing a chromium and aluminum antiferromagnetic layer which serves as a pinning layer for a magnetoresistive ferromagnetic layer.

The combination of a free magnetic layer overlapping a pinned magnetic layer is utilized in forming magnetic tunnel junction (MTJ) devices, which are devices that can sense magnetic fields or can be used as memory cells in magnetic random access (MRAM) arrays. The similarities in structure, if not in function, between spin valve sensors and magnetic tunnel junction devices is worth noting. Gallagher et al. (U.S. Pat. No. 5,841,692) discloses an MTJ wherein a top electrode stack includes a free ferromagnetic layer which is not pinned by exchange coupling. The said top electrode stack is formed over a tunneling layer which, in turn, is formed over a pinned ferromagnetic layer whose magnetic moment is pinned by interfacial exchange coupling to a lower antiferromagnetic layer. The pinned electrode stack in the MTJ device is a laminate of 20 nm Pt/4 nm NiFe/10 nm MnFe/8 nm NiFe, wherein the MnFe serves to antiferromagnetically couple the NiFe layers. Parkin (U.S. Pat. No. 5,764,567) discloses an MTJ device wherein a laminate comprising a seed layer, an antiferromagnetic layer, a pinned ferromagnetic layer, a tunnel junction layer and a free ferromagnetic layer are sandwiched between a pair of electrical lead layers. Further, Parkin (U.S. Pat. No. 5,936,293) provides an MTJ device with "hard"/"soft" ferromagnetic layers (ie. high coercivity/low coercivity) wherein adjacent ferromagnetic structures provide a transverse magnetic bias for the ferromagnetic layers that inhibits their ultimate demagnetization by motion of domain walls.

The spin valve structure has now become the implementation of choice in the fabrication of magnetic read head assemblies. However, the development of ultra-high recording densities, typically now in the range of >60 Gb/in$^2$, has placed stringent requirements on the GMR read head (unlike any such similar restrictions on the MTJ devices described above) for it to be capable of resolving very high linear bit density (bits per inch, or BPI) and track density (tracks per inch, or TPI). As a consequence, GMR read head design has been pushed in the direction of narrower trackwidths and thinner free layers in order to maintain high signal output in spite of thinner tracks and reduced gap length. The MTJ devices discussed above do not share the burden of GMR read heads that require their constant evolution to keep up with increasing recording density. Consequently, the MTJ devices do not provide ultra-thin free ferromagnetic layers and corresponding methods for increasing the magnetoresistive ratio and output levels. Similarly, the read heads provided by Barnard et al and Nepala et al. cited above do not have free layers of the requisite thinness required by the increased recording densities.

Ultra-thin free layers, which are here defined as layers whose magnetic moments are equivalent to those of a ferromagnetic layer whose moment is less than that of a 20 Å thickness of $Co_{90}Fe_{10}$ or 36 Å of $Ni_{80}Fe_{20}$, as well as increased MR ratios are both effective paths to higher signal strengths when reading increased recorded densities. In a related patent application (Ser. No. 09/992,517) the present applicants have already disclosed a novel bias compensation layer (BCL) that allows thinner read head structures while not affecting their electrical output. In another related patent application (Ser. No. 09/570,017 now issued as U.S. Pat. No. 6,521,507), the present applicants have disclosed novel material compositions for a single top spin valve read head with a synthetic antiferromagnet pinned layer that provides an enhanced degree of specular reflection and a larger difference in the mean-free-paths of spin up and spin down electrons. The present invention provides novel and advantageous attributes that build upon the inventions disclosed in these related applications yet go appreciably beyond them.

SUMMARY OF THE INVENTION

A first object of this invention is to provide a method for forming a giant magnetoresistive (GMR) sensor element with a specularly reflecting top spin valve structure, together with the giant magnetoresistive (GMR) specularly reflecting top valve sensor element formed by this method.

A second object of this invention is to provide a method for forming a giant magnetoresistive (GMR) specularly reflecting top spin valve sensor element which is capable of reading ultra-high density (approximately 100 Gb/in$^2$) magnetic recordings, together with the giant magnetoresistive (GMR) specularly reflecting top spin valve sensor element having said capability.

A third object of this invention is to provide a method for forming a giant magnetoresistive (GMR) specularly reflecting top valve sensor element with an ultra-thin free layer whose magnetostriction has a small positive value, which is highly advantageous for obtaining high signal output, together with the giant magnetoresistive specularly reflecting top spin valve element having said advantageous property.

A fourth object of this invention is to provide a method for forming a giant magnetoresistive (GMR) specularly reflecting top valve sensor element with a lead overlayer and bias structure that overcomes the amplitude loss associated with other structures of the prior art and provides improved stability, together with the element that has said capability.

In accord with the objects of this invention there is provided a specularly reflecting top spin valve giant magnetoresistive (GMR) sensor and a method for its fabrication. Said specularly reflecting top spin valve giant magnetoresistive sensor is fabricated in a manner that provides the following advantageous properties.

(1) Application of the bias compensation layer (BCL) and high conductive layer (HCL) effects that enhance specular reflection and allow the use of an ultra-thin free layer of CoFe having a total thickness of between 15 Å and 20 Å.
(2) A free layer which is a standard NiFe—CoFe composite layer yet yields a Dr equivalent to that of the BCL/CoFe spin valve provided in related patent application (HT99-031).
(3) GMR magnetostriction in the range between +1.0E-06 and +2.2E-06 for an ultra-thin free layer.
(4) A conductor lead overlay formation to improve output amplitude and sensor stability.

Further in accord with the objects of this invention, there is provided a specularly reflecting single top spin valve magnetoresistive sensor element ("top" referring to the position of the pinned layer) for which a typical optimal configuration (as formed between an upper and lower substrate) is empirically determined to be:

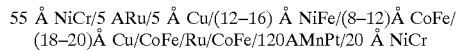
55 Å NiCr/5 ÅRu/5 Å Cu/(12–16) Å NiFe/(8–12)Å CoFe/ (18–20)Å Cu/CoFe/Ru/CoFe/120ÅMnPt/20 Å NiCr wherein the Ru/Cu buffer layer provides optimal crystal lattice matching to the CoFe and NiFe respectively, providing thereby the BCL (formed on Ru) and HCL (formed on Cu) effects that permit the formation of the ultra-thin NiFe/CoFe free layer, in which the NiFe is preferably physically thicker than the CoFe layer to provide an enhanced magnetic "softness" (decreased coercivity) to the free layer. The CoFe/Ru/CoFe combination forms a synthetic antiferromagnetic (SyAF) pinned layer, wherein the first antiparallel CoFe layer (AP1) can be thicker or thinner than the second antiparallel CoFe layer (AP2).

In accord with the objects of this invention there is provided a specularly reflecting top spin valve giant magnetoresistive (GMR) sensor and a method for its fabrication. Said specularly reflecting top spin valve giant magnetoresistive sensor is fabricated in a manner that provides the following advantageous properties.

(1) Application of the bias compensation layer (BCL) and high conductive layer (HCL) effects that enhance specular reflection and allow the use of an ultra-thin free layer of CoFe having a total thickness of between 15 Å and 20 Å.
(2) A free layer which is a standard NiFe—CoFe composite layer yet yields a Dr equivalent to that of the BCL/CoFe spin valve provided in related patent application (Ser. No. 09/992,517).
(3) GMR magnetostriction in the range between +1.0E-06 and +2.2E-06 for an ultra-thin free layer.
(4) A conductor lead overlay formation to improve output amplitude and sensor stability.

Yet further in accord with the objects of this invention, there is provided a laminated, synthetic antiferromagnetic pinned layer structure of the form CoFe/Ru/CoFe to insure robustness in the sense that the magnetic orientation of the pinned layer will remain essentially constant after it is oriented by annealing. Yet further in accord with the objects of said invention there is also incorporated an MnPt (antiferromagnetic) pinning layer. Under such circumstances, MnPt is characterized by a high blocking temperature, high exchange bias field ($H_{ex}$) and superior corrosion resistance.

BRIEF DESCRIPTION OF THE DRAWINGS

FIG. 1 (Table 1) is a table showing the relevant performance parameters for three spin valve structural configurations.

FIG. 2 (Table 2) is a table showing relevant performance parameters of three different free layer configurations.

FIG. 4 (Table 3) is a table showing the relevant performance parameters of four top spin valves fabricated in accord with the method of the present invention.

DESCRIPTION OF THE PREFERRED EMBODIMENTS

Figure 3A:
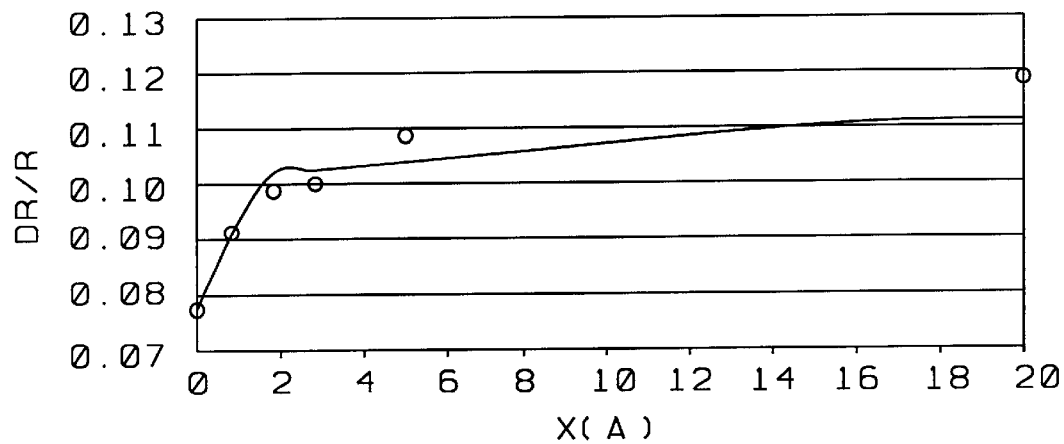
FIG. 3a is a graph of Dr/r of a composite NiFe—CoFe free layer vs. thickness of the CoFe layer.

The preferred embodiment of the present invention, a method for fabricating a spin valve magnetoresistive sensor (SVMR) of a specularly reflecting top spin valve type with an ultra-thin free layer, will be described following a discussion of a series of experimental investigations (device modeling) whose purpose was to establish an optimal configuration that met the objects of the invention. In particular it was necessary to make comparisons with a standard spin valve configuration of the prior art as well as with two previous spin valve configurations (described more fully in related patent applications Ser. Nos. 09/992,517 and 09/570,017 now issued as U.S. Pat. No. 6,522,507), hereinafter referred to as the BCL configuration and the HCL (spin filter) configuration, so named because the mean free path of spin-up electrons is increased but not that of spin-down electrons. These comparisons would focus on Dr/r, which provides a figure of merit for signal amplitude, as well as saturation magnetostriction, $\lambda_s$, which is a figure of merit for the magnetostriction of the ultra-thin free layer.

Referring first to FIG. 1, there is shown therein Table 1, indicating the values of certain parameters characterizing GMR sensor performance, specifically $B_s$ (free layer magnetic moment measured in nano Webers.), $H_c$ (free layer coercivity, measured in Oersteds), $H_e$ (interlayer coupling field, measured in Oersteds), $H_k$ (anisotropy field, in Oersteds), $R_s$ (sheet resistance, in Ohms/square), Dr/r (magnetoresistive ratio, dimensionless), Dr (magnetoresistive change, ohms/square) and $\lambda_s$ (saturation magnetostriction coefficient, dimensionless).

Three different spin valve configurations, none formed according to the method of the present invention, are represented in Table 1 of FIG. 1. Each configuration has an ultra-thin free layer magnetic moment equivalent to that of 37 Å (Angstroms) of NiFe. The particular configuration in row 3 of the table, which is the BCL (Ru buffer layer only) configuration, has the form:

55 Å CZB/5 Å Ru/CoFe(free layer)/(18–20) Å Cu/CoFe/7.5 Å Ru/CoFe/MnPt/20 Å CZB where Å represents Angstroms and CZB represents the magnetoresistance enhancing seedlayer material $Ni_{60}Cr_{40}$, deposited on a substrate of $Al_2O_3$. This particular configuration is formed with a free layer of CoFe only, rather than the conventional NiFe—CoFe free layer.

Within the configuration above, the 5 Å Ru layer is a buffer layer that forms an advantageous lattice match with the CoFe free layer and provides, thereby, an effective region for specular reflection of electrons. In fact, in the configuration above, there is a specular reflection factor of 0.6 at the Ru/CoFe interface. Not only does the Ru/CoFe formation provide a greater specular reflection factor (compared to NiFe, the CoFe produces a greater contrast between the spin dependent scattering of spin up and spin down electrons), but the CoFe layer so formed has a lower coercivity (is "softer") than other free layer configurations. The CoFe/7.5 Å Ru/CoFe tri-layer is a synthetic antiferromagnetic (SyAF) pinned layer, wherein the 7.5 Å Ru serves as a spacer layer to allow exchange coupling between the first antiparallel CoFe layer (AP1) and the second antiparallel CoFe layer (AP2). The interface between AP1 and the Ru also provides a specular reflection factor of 0.3. The MnPt layer formed on the AP2 layer is an antiferromagnetic pinning layer. Referring now to row 1 of Table 1, there is seen a configuration corresponding to a spin valve structure of the prior art. This configuration has a NiFe—CoFe composite free layer, but neither a Ru nor a Cu buffer layer. Finally, the configuration in the second row of Table 1 (the HCL configuration) has a 10 Å Cu buffer layer on which is formed a composite NiFe—CoFe free layer. As can be seen from the table, the output amplitude of the BCL configuration (row 3) as measured by Dr/r is greater than the standard configuration (row 1) which, in turn, is greater than that of the HCL configuration.

Referring next to FIG. 2, there is shown Table 2, which indicates performance parameters for an ultra-thin free layer deposited on various buffer layers. Row 1 refers to a standard NiFe—CoFe free layer deposited on a Cu buffer layer. Row 2 refers to a CoFe free layer deposited on a BCL(Ru) buffer layer. Row 3 refers to an HCL type CoFe free layer deposited on Cu. The last column of Table 2 shows the magnetostriction of these layers. Magnetostriction (the effect of stress on magnetization) is an important indicator of read-head performance quality. For a top spin valve, it is noted empirically that the magnetostriction increases asymptotically with the reduction in free layer thickness. It is also noted empirically that a small positive $\lambda_s$ (approximately 1.0 E-06) is desirable, whereas a negative $\lambda_s$ is indicative of poor performance.

Figure 3B:
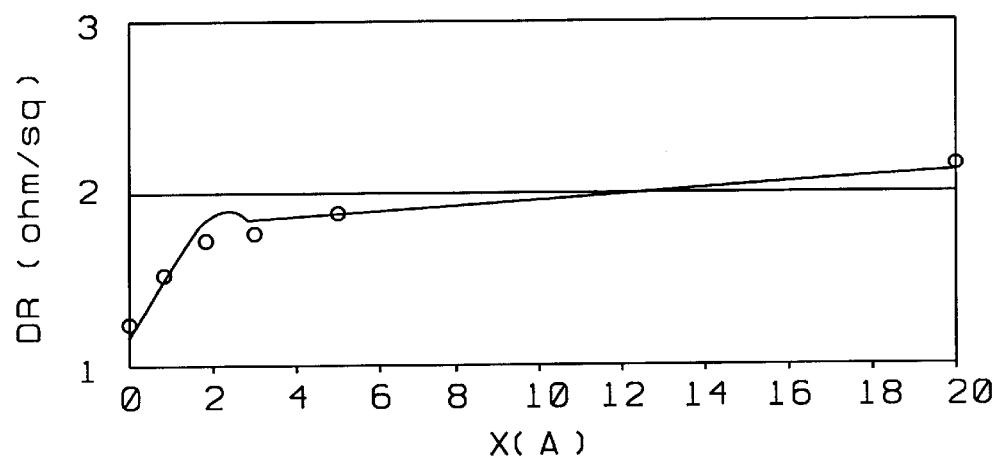
FIG. 3b is a graph of Dr of the composite NiFe—CoFe free layer in FIG. 3a vs. thickness of the CoFe layer.

Referring next to FIGS. 3a and 3b, there are shown two graphs plotting, respectively, Dr/r (FIG. 3a) and Dr (FIG. 3b) vs. CoFe thickness, X, for a top spin valve configuration of the following form:

CZB55 Å/NiFe Y/CoFe X/Cu18 Å/CoFe18 Å/Ru7.5 Å/CoFe23 Å/MnPt150 Å/CZB wherein the free layer magnetic moment, which is the total magnetic moment of Y Å of NiFe plus X Å of CoFe is equivalent to that of 37 Å of NiFe. It is noted on the graphs that when the thickness of the CoFe layer is less than 5 Å, both Dr/r and Dr falls off sharply, whereas for thicknesses of the CoFe layer greater than between 20 Å and 5 Å the dropoff is very gentle.

Referring next to FIG. 4, there is shown therein Table 3, a table of empirically determined parameters obtained from spin valve configurations formed according to the method of the present invention. The design of these configurations has drawn from the experimental investigations discussed above for the BCL and HCL configurations of the related patent applications (Ser. Nos. 09/992,517 and 09/570,017 now issued as U.S. Pat. No. 6,522,507). The configuration of the present invention, however, embodies and extends the advantages of the related patent applications through the use of a combined BCL/HCL (ie. Ru/Cu) buffer layer together with a composite (NiFe—CoFe) free layer, thereby improving them in a novel and significant manner as will be seen from the results in Table 3.

The first row of Table 3 describes experimental results obtained for a BCL/CoFe spin valve of the related patent application (Ser. No. 09/992,517). This row is included for reference purposes, to show that the configurations of the present invention, disclosed in rows 2, 3 and 4, all having composite (NiFe—CoFe) free layers formed on Ru/Cu buffer layers, provide an equivalent Dr to that of the BCL buffered CoFe free layer. Referring now to the last column of Table 3, it is seen that the lambda (saturation magnetostriction) value is a strongly advantageous small positive value for rows 2, 3 and 4, all being within the range between +5.0 E-07 and +2.0 E-06. It is also noted from column 3 of Table 3, that the inter-layer coupling field, He, is negative for rows 2, 3 and 4. For sensor stability, the synthetic antiferromagnetic pinning layer (SyAF), which in the configuration of rows 2, 3 and 4 comprises CoFe19 Å/Ru7.5 Å/CoFe21 Å, is formed with the first antiparallel layer (AP1) slightly thinner, at 19 Å, than the second antiparallel layer (AP2) at 21 Å. Since the relationship between $H_e$ and the thickness of the Cu spacer layer separating the free layer from the SyAF pinned layer, a positive $H_e$ can be obtained by using a thinner (or a thicker) Cu layer. In that case, AP1 should be made thicker than AP2 (ie. CoFe21 Å/Ru7.5 Å/CoFe19 Å).

Figure 5:
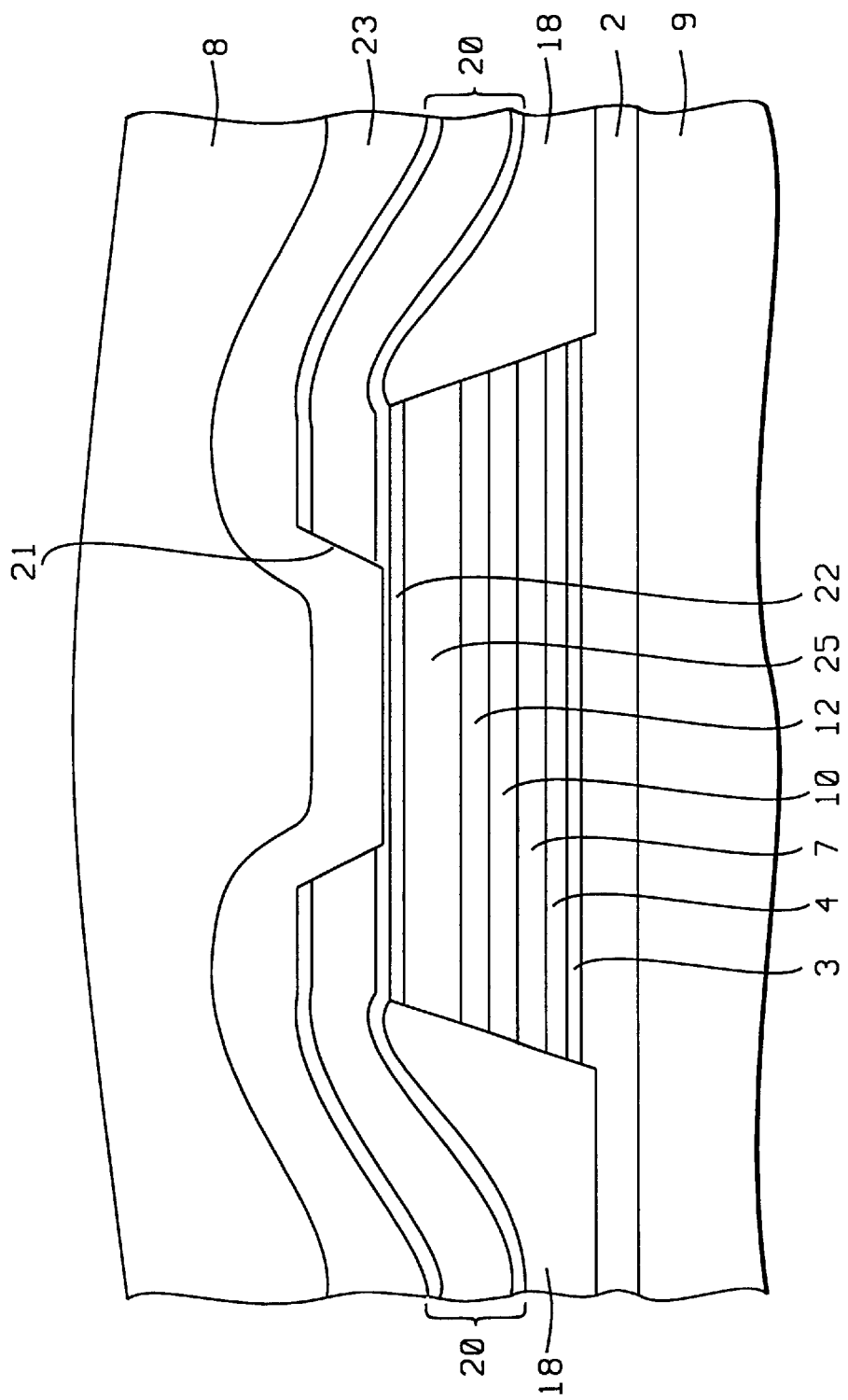
FIG. 5 is a schematic cross-sectional view of a top spin valve fabricated in accord with the method of the present invention.

Referring finally to FIG. 5, there is shown a cross-sectional schematic view of a read head sensor provided by the method and structure of the present invention. The sensor is shown as part of a complete read head fabrication wherein said sensor is formed between an upper (8) and lower (9) shield layer. Said sensor incorporates a hard magnetic longitudinal bias layer (18) comprising a Cr/CrPtCr layer of thickness between 150 Å and 250 Å formed against the sides of the sensor stack. Over said hard magnetic longitudinal bias layer there is formed a conducting lead overlayer (20) comprising a Ta50 Å/Au250 Å/Ta50 Å formation of approximately 350 Å total thickness.

The aforementioned bias and overlayer structures are superior to the contiguous hard bias design of the prior art, which improves sensor stability but also reduces output amplitude. In the lead overlay design (20) provided in the present invention, the GMR sensor trackwidth is defined by the conductor lead edge (21), while the hard magnetic longitudinal bias layer (18) is formed outside the conductor lead overlayer.

Referring again to the figure, there is seen a substrate (2), which can be a layer of $Al_2O_3$ formed to a thickness of between 100 Å and 200 Å. Over said substrate is formed a NiCr seed layer (3) of between 50 Å and 60 Å thickness, on which is formed a buffer layer (4), comprising a layer of Ru of approximately 5 Å thickness over which is formed a layer of Cu of approximately 5 Å thickness. Although 5 Å is the preferred thickness of the Ru and the Cu, a range between 4 Å and 6 Å is acceptable. The buffer layer (4) provides a lattice match to the composite free layer (7) formed upon it and enhances the specular reflection of electrons.

The composite free layer (7) is a double layer comprising a layer of NiFe of approximately 10 Å thickness formed on the Cu layer of the buffer layer (4), on which NiFe layer is then formed a layer of CoFe, of approximately 10 Å thickness. Although approximately 10 Å is the preferred thickness of the NiFe and CoFe layers, a range of between 12 Å and 16 Å is acceptable for the NiFe layer and a range between 8 Å and 12 Å for the CoFe layer is acceptable. A spacer layer of Cu (10), of approximately 19 Å thickness is then formed on the composite free layer. Although 19 Å is the preferred thickness for said Cu spacer layer, a range of between 18 Å and 20 Å is acceptable. Over said spacer layer there is then formed a synthetic antiferromagnetic (SyAF) pinned layer (12), which is a triple layer formation comprising a first antiparallel (AP1) layer, which is a layer of CoFe formed to a thickness of approximately 19 Å, over which is formed a spacer layer of Ru, of approximately 7.5 Å thickness, over which is formed a second antiparallel layer (AP2), which is a layer of CoFe of approximately 21 Å thickness. The Ru spacer layer produces the antiparallel configuration of the two CoFe layers through a mechanism of exchange coupling. As discussed above, the thicknesses of AP1 and AP2 may be interchanged along with a corresponding change in the thickness of the Cu spacer layer (10). An antiferromagnetic pinning layer (25) of MnPt is formed to a thickness of approximately 120 Å on the AP2 layer. Said pinning layer may be formed to a thickness of between 100 Å and 200 Å. Finally an upper capping layer of NiCr (CZB) or Ta (22) is formed over the pinning layer to a thickness of between 20 Å and 30 Å. Completing the read-head fabrication is an upper substrate formed of $Al_2O_3$ (23), covering the conducting lead overlays and the bottom Ta layer of the lead overlays where said Ta layer covers the capping layer (22) on the upper surface of the sensor at its trackwidth.

As is understood by a person skilled in the art, the preferred embodiment of the present invention is illustrative of the present invention rather than being limiting of the present invention. Revisions and modifications may be made to methods, processes, materials, structures, and dimensions through which is formed a specularly reflecting top spin valve read head with ultra-thin free layer for ultra-high recording densities, while still providing a specularly reflecting top spin valve read head with ultra-thin free layer for ultra-high recording densities, formed in accord with the present invention as defined by the appended claims.

What is claimed is:

1. A method for fabrication a specularly reflecting top spin valve read head with ultra-thin free layer for ultra-high recording densities comprising:

providing an $Al_2O_3$ substrate;

forming over said $Al_2O_3$ substrate an NiCr seed layer;

forming over said NiCr seed layer a buffer layer which is a double layer of lattice-matching and specular reflection enhancing material;

forming over said buffer layer an ultra-thin laminated double layer of ferromagnetic material which will function as a magnetic free layer and wherein the lattice of a first layer of the free layer is lattice-matched to a second layer of said buffer layer and wherein the lattice of a second layer of the free layer is lattice-matched to a first layer of the buffer layer;

forming over said laminated magnetic free layer a spacer layer of non-magnetic material;

forming over said spacer layer a laminated, synthetic antiferromagnetic pinned layer;

forming over said laminated, synthetic antiferromagnetic pinned layer an antiferromagnetic pinning layer;

forming over said pinning layer a capping layer;

forming, on either side of said read head, a hard magnetic longitudinal bias layer;

forming on each of said hard magnetic longitudinal biasing layers a conducting lead overlay extending symmetrically beyond each of said hard magnetic biasing layers and over said read head capping layer to define, thereby, a read head trackwidth.

2. The method of claim 1 wherein the first layer of lattice-matching and specular reflection enhancing material is a layer of Ru formed to a thickness of approximately 5 Å and wherein the second layer of lattice-matching and specular reflection enhancing material is a layer of Cu formed to a thickness of approximately 5 Å.

3. The method of claim 1 wherein the laminated ferromagnetic free layer comprises a first ferromagnetic layer and a second ferromagnetic layer and wherein said second ferromagnetic layer is formed on said first ferromagnetic layer.

4. The method of claim 3 wherein said first ferromagnetic layer is a layer of NiFe and is formed to a thickness of between 10 Å and 16 Å.

5. The method of claim 3 wherein said second ferromagnetic layer is a layer of CoFe and is formed to a thickness of between 8 Å and 12 Å.

6. The method of claim 1 wherein the non-magnetic spacer layer is a layer of Cu formed to a thickness of between 16 Å and 22 Å.

7. The method of claim 1 wherein the laminated synthetic antiferromagnetic pinned layer consists of a first antiparallel ferromagnetic layer, on which is formed a non magnetic spacer layer, on which is formed a second antiparallel ferromagnetic layer, the resulting structure being exchange coupled through said spacer layer.

8. The method of claim 7 wherein the first antiparallel ferromagnetic layer is thicker than the second antiparallel ferromagnetic layer.

9. The method of claim 7 wherein the first antiparallel ferromagnetic layer is thinner than the second antiparallel ferromagnetic layer.

10. The method of claim 7 wherein said antiparallel first ferromagnetic layer is a layer of CoFe formed to a thickness of between 15 Å and 20 Å, the non-magnetic spacer layer is a layer of Ru formed to a thickness of approximately 7.5 Å and the second antiparallel ferromagnetic layer is a layer of CoFe formed to a thickness of between 15 Å and 20 Å, but wherein said second antiparallel ferromagnetic layer thickness is chosen to be less than the thickness of said first antiparallel ferromagnetic layer.

11. The method of claim 8 wherein said first antiparallel ferromagnetic layer is a layer of CoFe formed to a thickness of between 16 Å and 20 Å, the non-magnetic spacer layer is a layer of Ru formed to a thickness of approximately 7.5 angstroms and the second antiparallel ferromagnetic layer is a layer of CoFe formed to a thickness of between 18 Å and 21 Å, but wherein said second antiparallel ferromagnetic layer thickness is chosen to be greater than the thickness of said first antiparallel ferromagnetic layer.

12. The method of claim 1 wherein the pinning layer is a layer of MnPt and is formed to a thickness of between 100 Å and 200 Å.

13. The method of claim 1 wherein the capping layer is a layer of NiCr or Ta and is formed to a thickness of between 20 and 30 Å.

14. The method of claim 1 wherein the longitudinal magnetic bias layer is a layer of magnetic material of high coercivity.

15. The method of claim 14 wherein the magnetic material of high coercivity is a layer of CoPtCr formed to a thickness of between 150 Å and 250 Å.

16. The method of claim 1 wherein the conducting lead overlayer is a triple layer of Ta/Au/Ta formed to a total thickness of approximately 350 Å and wherein the thickness of each Ta layer is approximately 50 Å and the thickness of the central Au layer is approximately 250 Å.

17. A specularly reflecting top spin valve read head with ultra-thin free layer for ultra-high recording densities comprising:
   an $Al_2O_3$ substrate;
   an NiCr seed layer;
   a buffer layer which is a double layer of lattice-matching, specular reflection enhancing material;
   an ultra-thin double layer of ferromagnetic material which functions as a magnetic free layer formed over said buffer layer, wherein the lattice of a first layer of the free layer is lattice-matched to a second layer of said buffer layer and wherein the lattice of a second layer of the free layer is lattice-matched to a first layer of the buffer layer;
   a spacer layer of non-magnetic material formed over said magnetic free layer of ferromagnetic material;
   a laminated synthetic antiferromagnetic pinned layer formed over said spacer layer;
   an antiferromagnetic pinning layer formed over said laminated pinned layer;
   a capping layer formed over said pinning layer;
   a hard magnetic longitudinal bias layer formed on either side of said read head;
   a conducting lead overlay formed on each of said hard magnetic longitudinal biasing layers extending symmetrically beyond each of said hard magnetic biasing layers and over said read head capping layer to define, thereby, a read head trackwidth.

18. The structure of claim 17 wherein the first layer of lattice-matching and specular reflection enhancing material is a layer of Ru formed to a thickness of approximately 5 Å and wherein the second layer of lattice-matching and specular reflection enhancing material is a layer of Cu formed to a thickness of approximately 5 Å.

19. The structure of claim 17 wherein the laminated ferromagnetic free layer comprises a first ferromagnetic layer and a second ferromagnetic layer and wherein said second ferromagnetic layer is formed on said first ferromagnetic layer.

20. The structure of claim 19 wherein said first ferromagnetic layer is a layer of NiFe and is formed to a thickness of between 10 Å and 16 Å.

21. The structure of claim 19 wherein said second ferromagnetic layer is a layer of CoFe and is formed to a thickness of between 8 Å and 12 Å.

22. The structure of claim 17 wherein the non-magnetic spacer layer provides magnetic exchange coupling between the laminated ferromagnetic free layer and the synthetic antiferromagnetic pinned layer.

23. The structure of claim 22 wherein the thickness of the non-magnetic spacer layer controls the sign and magnitude of the inter-layer coupling field.

24. The structure of claim 23 wherein the non-magnetic spacer layer is a layer of Cu formed to a thickness of between 16 Å and 22 Å.

25. The structure of claim 17 wherein the laminated synthetic antiferromagnetic pinned layer consists of a first antiparallel ferromagnetic layer, on which is formed a non magnetic spacer layer, on which is formed a second antiparallel ferromagnetic layer, the resulting structure being exchange coupled through said spacer layer.

26. The structure of claim 25 wherein the first antiparallel ferromagnetic layer is thicker than the second antiparallel ferromagnetic layer.

27. The structure of claim 25 wherein the first antiparallel ferromagnetic layer is thinner than the second antiparallel ferromagnetic layer.

28. The structure of claim 26 wherein said antiparallel first ferromagnetic layer is a layer of CoFe formed to a thickness of between 15 Å and 20 Å, the non-magnetic spacer layer is a layer of Ru formed to a thickness of approximately 7.5 Å and the second antiparallel ferromagnetic layer is a layer of CoFe formed to a thickness of between 15 Å and 20 Å, but wherein said second antiparallel ferromagnetic layer thickness is chosen to be less than the thickness of said first antiparallel ferromagnetic layer.

29. The structure of claim 27 wherein said first antiparallel ferromagnetic layer is a layer of CoFe formed to a thickness of between 16 Å and 22 Å, the non-magnetic spacer layer is a layer of Ru formed to a thickness of approximately 7.5 Å and the second antiparallel ferromagnetic layer is a layer of CoFe formed to a thickness of between 18 Å and 21 Å, but wherein said second antiparallel ferromagnetic layer thickness is chosen to be greater than the thickness of said first antiparallel ferromagnetic layer.

30. The structure of claim 17 wherein the pinning layer is a layer of MnPt and is formed to a thickness of between 100 Å and 200 Å.

31. The structure of claim 17 wherein the capping layer is a layer of NiCr or Ta, formed to a thickness of between 17 Å and 30 Å.

32. The structure of claim 17 wherein the longitudinal magnetic bias layer is a layer of magnetic material of high coercivity.

33. The structure of claim 32 wherein the magnetic material of high coercivity is a layer of CoPtCr formed to a thickness of between 150 Å and 250 Å.

34. The structure of claim 17 wherein the conducting lead overlayer is a triple layer of Ta/Au/Ta formed to a total thickness of approximately 350 Å and wherein the thickness of each Ta layer is approximately 50 Å and the thickness of the central Au layer is approximately 250 Å.

* * * * *